US009516303B2

(12) United States Patent
Gong

(10) Patent No.: US 9,516,303 B2
(45) Date of Patent: Dec. 6, 2016

(54) TIMESTAMP IN PERFORMANCE BENCHMARK

(71) Applicant: VMware, Inc., Palo Alto, CA (US)

(72) Inventor: Yue Gong, Beijing (CN)

(73) Assignee: VMware, Inc., Palo Alto, CA (US)

(*) Notice: Subject to any disclaimer, the term of this patent is extended or adjusted under 35 U.S.C. 154(b) by 139 days.

(21) Appl. No.: 14/254,884

(22) Filed: Apr. 16, 2014

(65) Prior Publication Data

US 2015/0304655 A1    Oct. 22, 2015

(51) Int. Cl.
| | |
|---|---|
| *G06K 9/00* | (2006.01) |
| *H04N 17/02* | (2006.01) |
| *H04N 21/44* | (2011.01) |
| *H04N 21/442* | (2011.01) |
| *H04L 12/26* | (2006.01) |
| *H04N 7/173* | (2011.01) |

(52) U.S. Cl.
CPC ............ *H04N 17/02* (2013.01); *H04L 43/106* (2013.01); *H04N 21/44008* (2013.01); *H04N 21/44231* (2013.01)

(58) Field of Classification Search
USPC ................ 382/100, 103, 106–107, 155, 162, 165,382/168, 173, 181, 199, 219, 232, 244, 254,382/274, 276, 286–295, 305, 312; 725/114; 709/203; 713/176; 370/231
See application file for complete search history.

(56) References Cited

U.S. PATENT DOCUMENTS

| | | | |
|---|---|---|---|
| 7,768,937 B2 | 8/2010 | Isambart et al. | |
| 8,166,107 B2* | 4/2012 | Makhija | G06F 9/455 370/231 |
| 8,209,539 B2 | 6/2012 | Baudry et al. | |
| 8,347,344 B2* | 1/2013 | Makhija | H04N 21/2402 725/114 |
| 9,113,177 B2 | 8/2015 | Molander | |
| 2008/0204592 A1 | 8/2008 | Jia et al. | |
| 2010/0162338 A1* | 6/2010 | Makhija | H04N 21/2402 725/114 |
| 2011/0047211 A1* | 2/2011 | Makhija | G06F 9/455 709/203 |
| 2012/0096146 A1 | 4/2012 | Barnett | |
| 2012/0194874 A1 | 8/2012 | Milanski | |
| 2012/0260277 A1 | 10/2012 | Kosciewicz | |
| 2013/0096904 A1 | 4/2013 | Hui et al. | |
| 2013/0097426 A1* | 4/2013 | Agrawal | G06T 1/0021 713/176 |
| 2014/0105576 A1 | 4/2014 | Lou et al. | |
| 2014/0136944 A1 | 5/2014 | Harris et al. | |
| 2014/0177734 A1 | 6/2014 | Carmel et al. | |
| 2015/0007029 A1 | 1/2015 | Gong et al. | |

OTHER PUBLICATIONS

Lawrence Spracklen et al., "Comprehensive User Experience Monitoring", VMware Technical Journal, Apr. 2012, pp. 22-31, vol. 1, No. 1.
Omer Boyaci et al., "vDelay: A Tool to Measure Capture-to-Display Latency and Frame Rate", 11th IEEE International Symposium on Multimedia, 2009, pp. 194-200.

* cited by examiner

Primary Examiner — Seyed Azarian

(57) ABSTRACT

A method is provided for a computer to measure performance. The method includes capturing frames of at least a portion of a video on the computer and detecting timestamps on the captured frames, and determining a frame rate of the video playback based on the timestamps. Each timestamp includes data elements of first and second colors that are spaced apart from each other and set against a background of a third color so adjacent data elements are separated by areas of the third color.

14 Claims, 5 Drawing Sheets

TIMESTAMP IN PERFORMANCE BENCHMARK

CROSS-REFERENCE TO RELATED APPLICATION

This application is related to U.S. patent application Ser. No. 13/931,933, filed Jun. 30, 2013, entitled "Relative Frame Rate as Display Quality Benchmark for Remote Desktop," which is commonly owned and incorporated by reference in its entirety.

BACKGROUND

In a typical virtual desktop infrastructure (VDI) architecture, displays and input devices are local, and applications execute remotely in a server. A user's desktop is typically hosted in a datacenter or cloud, and the user remotely interacts with her desktop via a variety of endpoint devices, including desktops, laptops, thin clients, smart phones, and tablets. There are many other instances where users may interact with a computer system remotely.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are therefore not to be considered limiting of its scope, the disclosure will be described with additional specificity and detail through use of the accompanying drawings.

In the drawings.

DETAILED DESCRIPTION

User experience is a key consideration when organizations decide on software for deploying remote desktops. An important way to measure user experience is to determine the display quality visually seen by the users. One indicator of display quality is the relative frame rate, which is the ratio between the frame rate at the client and the frame rate at the server. To measure the frame rates, a video player plays a timestamp video at the server and the screens at the server side and the client side are captured. The frame rate on each side is determined as the number of captured frames with unique timestamps divided by the duration of the capture.

When a user resizes the video player, the timestamp is also resized and may be partially cut off. For example, a portion of the timestamp near the edge may be cut off when the video is resized. Thus the timestamps should be detectable when they are resized and partially cut off. When a remote display protocol uses a lossy compression to transmit the video from the server to the client, noise is introduced into the video. Thus the timestamps should resist noise introduced by the lossy compression.

In accordance with examples of the present disclosure, a timestamp that is detectable after being resized or lossily compressed is provided. The timestamp includes data elements of first and second colors that are spaced apart and set against a background of a third color so adjacent data elements are separated by areas of the third color between them. For example, the timestamp includes black and white columns that are spaced apart and set against a red background.

When the timestamp is resized, adjacent columns remain separated by red areas between them so the columns can be detected. The length of the columns may allow the timestamp to be detected even when it is partially cut off. The columns are also sized so they are greater than a processing unit of a lossy compression in order to resist noise introduced into the timestamp during encoding.

Figure 1:
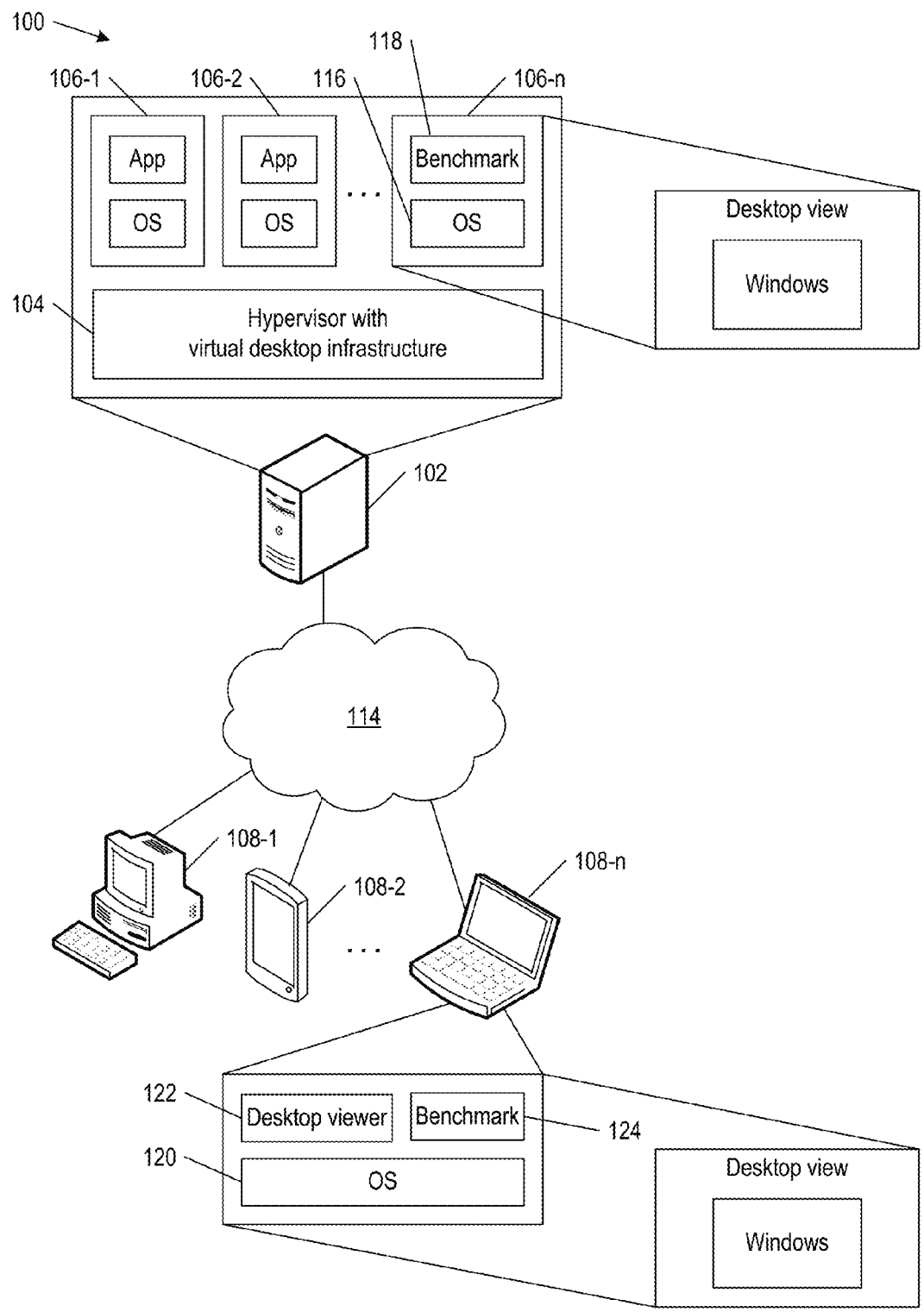
FIG. 1 is a block diagram illustrating a simplified view of a remote desktop system in examples of the present disclosure.

FIG. 1 is a block diagram illustrating a simplified view of a remote desktop system 100 in examples of the present disclosure. System 100 includes at least one server computer 102 that provides virtual desktop services to remote users. Server computer 102 runs a hypervisor 104 with virtual desktop infrastructure (VDI) that manages the assignment of virtual machines (VMs) 106-1, 106-2 . . . 106-$n$ (collectively as "VMs 106") to remote users. The remote users use clients 108-1, 108-2 . . . 108-$n$ (collectively as "clients 108") to access remote desktops on VMs 106. Clients 108 may be laptops, desktops, tablet computers, and smart phones. Clients 108 provide display presentation and input/output capabilities associated with virtual machines 106. Clients 108 communicate with server 102 via a network 114. VMs 106 communicate with corresponding clients using a remote display protocol. The remote display protocol may be any display remoting protocol, such as PC-over-IP (PCoIP) from Teradici Corporation, Remote Desktop Protocol (RDP) from Microsoft, or Blast from VMware, Inc. Depending on processor and network bandwidth, the remote display protocol may send the remote desktop at about 30 frames per second (fps).

VM 106-$n$ includes a guest operating system (OS) 116 and a benchmark server application 118. Client 108-$n$ includes an OS 120, a desktop viewer application 122, and a benchmark client application 124. Desktop viewer application 122 displays the remote desktop of VM 106-$n$ on client 108-$n$. Benchmark server application 118 and benchmark client application 124 work together to benchmark the user experience of the VDI in system 100.

Figure 2:
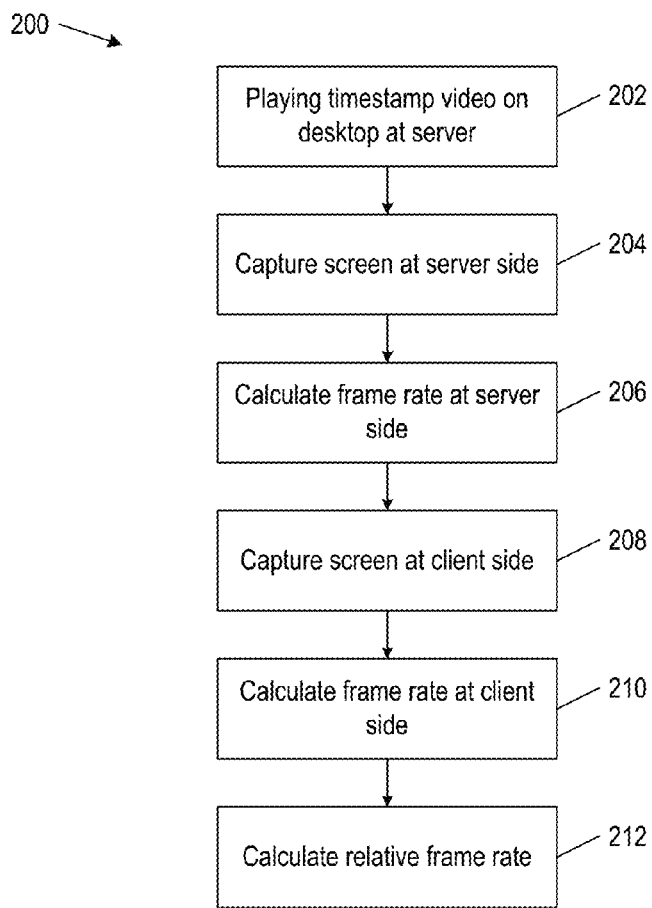
FIG. 2 is a flowchart of a method for a benchmark server application and a benchmark client application of FIG. 1 to determine a relative frame rate in examples of the present disclosures.

FIG. 2 is a flowchart of a method 200 for benchmark server application 118 (FIG. 1) and benchmark client application 124 (FIG. 1) to determine a relative frame rate in examples of the present disclosures. Method 200 may begin in block 202.

In block 202, benchmark server application 118 plays a timestamp video on the remote desktop on VM 106-$n$ at the server side. The timestamp video is played back at a fast rate, such as 100 fps. The timestamp video has frames embedded with unique timestamps.

Figure 3:
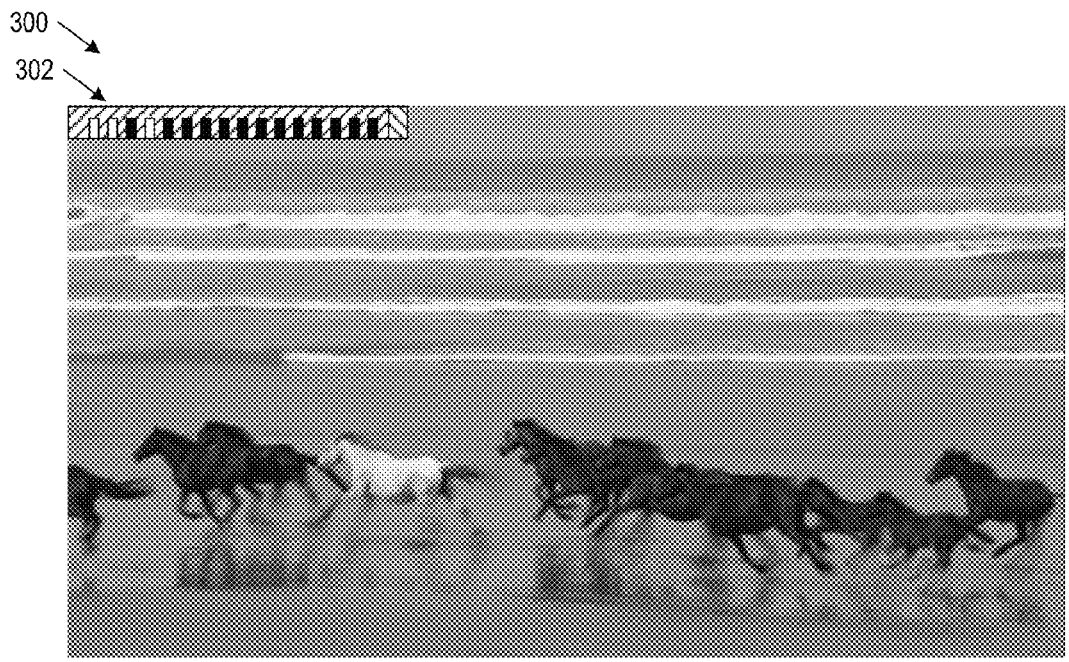
FIG. 3 shows a frame with a timestamp from a timestamp video in examples of the present disclosure.

FIG. 3 shows a frame 300 with a timestamp 302 in examples of the present disclosure. Although timestamp 302 is shown on the upper left corner of frame 300, timestamp 302 may be placed at other locations.

Figure 4:
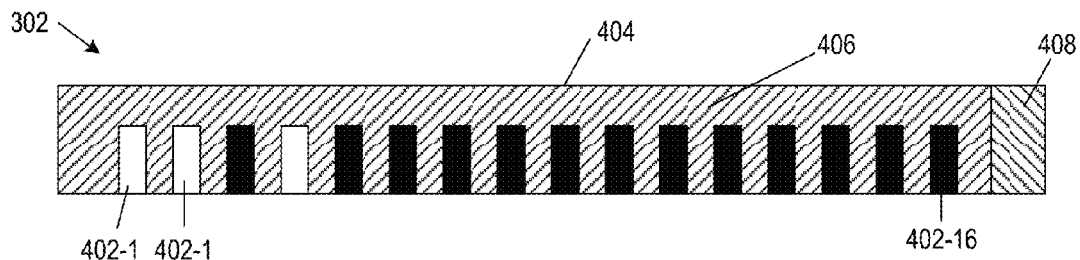
FIG. 4 shows the timestamp of FIG. 3 in examples of the present disclosure.

FIG. 4 shows timestamp 302 in examples of the present disclosure. Timestamp 302 includes data elements 402-1, 402-2 . . . 402-16 (collectively as "data elements 402" or individually as a generic "data element 402").

Each data element 402 has a first color or a second color, such as black or white. Data elements 402 are spaced apart and set against a background 404 that has a different color, such as red. This allows adjacent data elements 402 to remain separated by red areas between them when the timestamp is resized. Data elements 402 are elongated so they may be partially cut off and still detected.

Data elements 402 are sized greater than a processing unit of a lossy compression, such as the 8 by 8 block of pixels for JPEG. This allows each data element 402 to be encoded with as much of its original color (pure black or pure white) as possible in the lossy compression in order to reduce the noise introduce by the lossy compression.

Data elements 402 may be columns, and each column 402 may be 12 by 24 pixels on the screen. Background 404 may be rectangular. A portion 406 of background 404 forms an identifier marker for timestamp 302. Identifier marker 406 may be located above (or below) columns 402. Timestamp 302 further includes an end marker 408 of another color, such as blue, for timestamp 302. End marker 408 may be located to the left (or right) of background 404.

Each column 402 is mapped to a bit based on its color. For example, black columns are mapped to a zero bit while white columns are mapped to a one bit. Note that a sixteen column timestamp 302 provide a time span of (2^16 frames)/(100 fps)=655.36 seconds≈11 minutes.

Referring back to FIG. 2, block 202 may be followed by block 204.

In block 204, benchmark server application 118 captures frames of at least a portion of the video on the screen of VM 106-*n* at the server side for a predetermined amount of time, such as one to several minutes. In one example, benchmark server application 118 captures the screen at a rate, such as 200 fps, faster than the playback rate of the timestamp video. Benchmark server application 118 detects and reads the timestamp on each captured frame, and counts the number of captured frames with unique timestamps. Block 204 may be followed by block 206.

In block 206, benchmark server application 118 calculates the frame rate on VM server 106-*n* at the server side. The frame rate is calculated as follows:

$$FrameRate = \frac{SUM \text{ of unique frames}}{Time \text{ span of screen capture}}, \quad (1)$$

where "SUM of unique frames" is the count from block 204, and the "Time span of screen capture" is equal to the difference in last and the first timestamps divided by the timestamp playback rate (e.g., 100 fps). Block 206 may be followed by block 208.

In block 208, benchmark client application 124 captures frames of at least a portion of the video on the screen of client 108-*n* on the client side for a predetermined amount of time, such as one to several minutes. In one example, benchmark client application 124 captures the screen at a rate, such as 50 fps, faster than the rate of the remote display protocol, such as 30 fps. Benchmark client application 124 may save the captured frames in a shared folder on VM 106-*n* that can be accessed by benchmark server application 118. Block 208 may be followed by block 210.

In block 210, benchmark server application 118 calculates the frame rate at client 108-*n* on the client side. First, benchmark server application 118 retrieves the captured frames from the shared folder, detects and reads the timestamp on each captured frame, and counts the number of captured frames with unique timestamps. The frame rate at client 108-*n* at the client side is also calculated with equation (1) described above. Block 210 may be followed by block 212.

In block 212, benchmark server application 118 calculates the relative frame rate as follows:

$$RelativeFrameRate = \frac{frame \text{ rate at client side}}{frame \text{ rate at server side}}. \quad (2)$$

Figure 5:
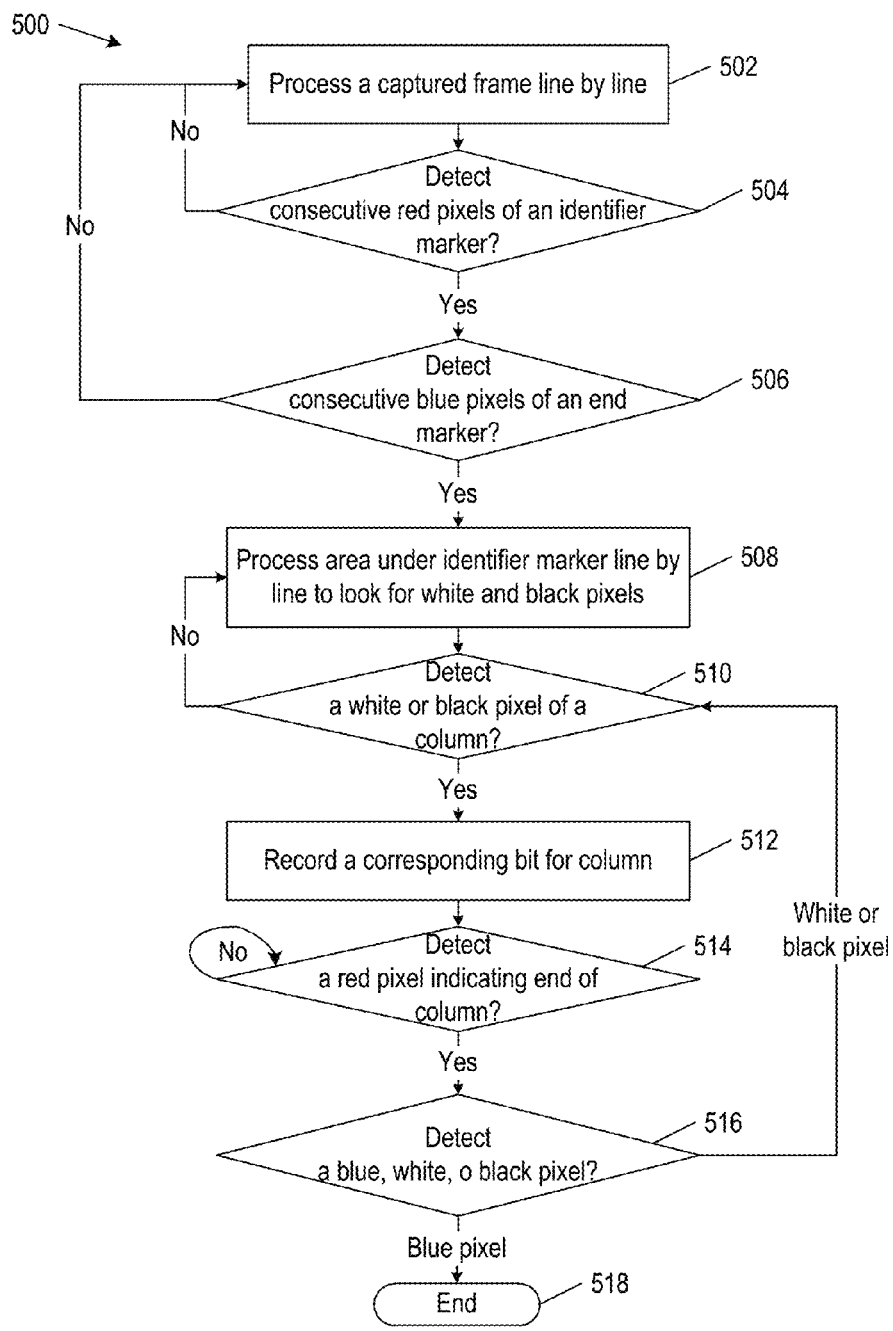
FIG. 5 is a flowchart of a method for a benchmark server application and a benchmark client application to detect and read a timestamp from a captured screen in examples of the present disclosure.

FIG. 5 is a flowchart of a method 500 for an application, such as benchmark server application 118 (FIG. 1) or benchmark client application 124 (FIG. 1), to detect and read a timestamp 302 from a captured screen 300 in examples of the present disclosure. Method 500 may begin in block 502.

In block 502, the application starts to process a captured frame 300 (FIG. 3) horizontally line by line. Block 502 may be followed by block 504.

In block 504, the application determines if consecutive red pixels of an identifier marker 406 (FIG. 4) in a timestamp 302 have been detected in the current line. For example, the application determines if more than 350 consecutive red pixels have been detected in the line. If so, block 504 may be followed by block 506. Otherwise block 504 may loop back to block 502 to process another line in the captured frame.

In block 506, the application determines if consecutive blue pixels of an end marker 408 (FIG. 4) have been detected in the current line. For example, the application determines if more than 10 consecutive blue pixels follow the red pixels detected in block 504. If so, block 506 may be followed by block 508. Otherwise block 506 may loop back to block 502 to process another line in the captured frame.

In block 508, the application starts to process the area under identifier marker 406 line by line to look for white and black pixels. Block 508 may be followed by block 510.

In block 510, the application scans the current line pixel by pixel until a white or black pixel of a column 402 has been detected. When a white or a black pixel is detected, block 510 may be followed by block 512. When a white or a black pixel is not found in the current line, block 510 may loop back to block 508 to process the next line under identifier marker 406.

In block 512, the application records a bit value corresponding to the color of the detected column 402. Block 512 may be followed by block 514.

In block 514, the application continues to scan the following pixels of the current line until a red pixel indicating the end of the detected column 402 has been detected. When a red pixel is detected, block 514 may be followed by block 516. Otherwise block 514 loops back to itself to process the current line until a red pixel is detected.

In block 516, the application scans the following pixels of the current line until a blue, while, or black pixel has been detected. When a blue pixel is detected, the application has reached the end of timestamp 302 so block 516 may be followed by block 518, which ends method 500 as all the columns have been detected and the bit values of timestamp 302 have been determined. Alternatively to confirm the recorded bit values, block 516 may loop back to block 508 to process the next line under identifier marker 406. When a white or black pixel is detected, the application has detected a new column 402 so block 516 loops back to block 512 to record a bit value corresponding to the color of the detected column 402.

Figure 6:
FIG. 6 shows a timestamp in examples of the present disclosure.

FIG. 6 shows a frame 600 with a timestamp 602 in examples of the present disclosure. Although timestamp 602 is shown on the upper right corner of frame 600, timestamp 602 may be placed at other locations. Timestamp 602 differs from timestamp 302 (FIG. 4) in that rows 604 are used instead of columns 402 (FIG. 4). Essentially timestamp 602 is timestamp 302 rotated orthogonally. Method 500 (FIG. 5) described above may be used to detect timestamp 602 by scanning frame 600 vertically line by line.

Figure 7:
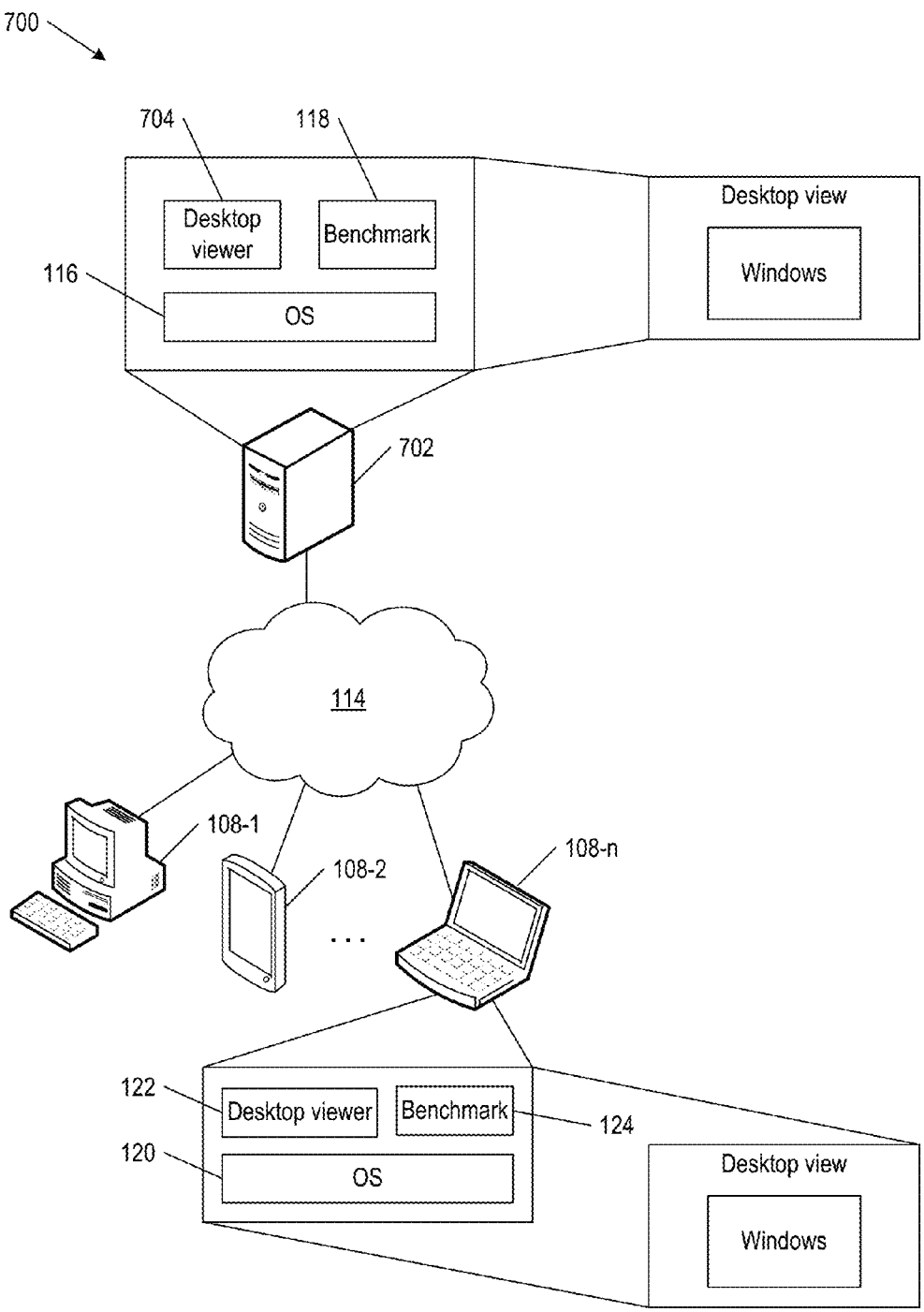
FIG. 7 is a block diagram illustrating a simplified view of a remote desktop system in examples of the present disclosure.

In addition to remote desktops running on VMs, the benchmark methods and applications in the present disclosure may also be applied to systems with remote desktops running on physical machines. FIG. 7 is a block diagram illustrating a simplified view of a remote desktop system 700 in examples of the present disclosure. System 700 is similar to system 100 (FIG. 1) except server computer 102 with VMs 106 is replaced with a computer 702 running OS 116, a benchmark server application 118, and a desktop viewer application 704. Desktop viewer application 122 communicates with desktop viewer application 704 to display the remote desktop of computer 902 on client 108-*n*. Benchmark server application 118 and benchmark client application 124 work together to benchmark the user experience of the remote desktop in system 700.

From the foregoing, it will be appreciated that various embodiments of the present disclosure have been described herein for purposes of illustration, and that various modifications may be made without departing from the scope and spirit of the present disclosure. For example, a timestamp may include data elements that are black and white radii set against a red background that is circular. Accordingly, the various embodiments disclosed herein are not intended to be limiting, with the true scope and spirit being indicated by the following claims.

I claim:

1. A method for a computer configured to run a benchmark application by executing instructions stored in non-transitory computer readable storage medium to measure performance, the method comprising:
    capturing, by the computer configured to run a benchmark application, frames of at least a portion of a video on the computer;
    detecting, by the computer configured to run a benchmark application, timestamps on the captured frames, each timestamp comprising data elements of first and second colors, the data elements being spaced apart from each other and set against a background of a third color so adjacent data elements are separated by areas of the third color, wherein each data element comprises a size greater than a processing block of a lossy compression that was used to encode the video; and
    determining, by the computer configured to run a benchmark application, a frame rate of the video based on the timestamps.

2. The method of claim 1, wherein the data elements comprise columns.

3. The method of claim 2, wherein the background is rectangular, a part of the background above or below the columns forms an identifier marker, the timestamp further comprises an end marker to right or left of the background, the end marker comprising a fourth color.

4. The method of claim 1, wherein detecting the timestamps on the captured frames comprises:
    scanning lines of a frame;
    discovering a timestamp by detecting a first line with a first plurality of consecutive pixels of the third color followed by a second plurality of consecutive pixels of a fourth color, the first plurality of consecutive pixels comprising an identifier marker identifying the timestamp, the second plurality of consecutive pixels comprising an end marker identifying an end of the timestamp; and
    determining a number represented by the timestamp by detecting a second line with at least a first pixel of the first or the second color, at least a second pixel of the third color that follows the first pixel, at least a third pixel of the first or the third color that follows the second pixel, wherein the first and the third pixels comprise two data elements, the first and the second colors represent first and second values, respectively, and the second pixel comprises an area separating the two data elements.

5. The method of claim 1, wherein the data elements comprise rows.

6. The method of claim 1, wherein determining the frame rate of the video playback comprises dividing a number of unique timestamps by a duration of capturing the frames of the video.

7. The method of claim 1, wherein the video originates from a remote desktop on another computer.

8. A method for a computer configured to run a benchmark application by executing instructions stored in non-transitory computer readable storage medium to measure performance, the method comprising:
    playing, by the computer configured to run a benchmark application, a video on the computer, the video comprising frames embedded with timestamps, each timestamp comprising data elements of first and second colors that are spaced apart from each other and set against a background of a third color so adjacent data elements are separated by areas of the third color, wherein each data element comprises a size greater than a processing block of a lossy compression that was used to encode the video; and
    transmitting, by the computer configured to run a benchmark application, a playback of the video from the computer to another computer.

9. The method of claim 8, wherein the data elements comprise columns.

10. The method of claim 9, wherein the background is rectangular, a part of the background above or below the columns forms an identifier marker, the timestamp further comprises an end marker to right or left of the background, the end marker comprising a fourth color.

11. The method of claim 8, wherein the data elements comprise rows.

12. A non-transitory, computer-readable storage medium encoded with instructions executable by a processor to:
    capture frames of at least a portion of a video on a computer;
    detect timestamps on the captured frames, each timestamp comprising data elements of first and second colors that are spaced apart from each other and set against a background of a third color so adjacent data elements are separated by areas of the third color, wherein each data element comprises a size greater than a processing block of a lossy compression that was used to encode the video; and determine a frame rate of the video based on the timestamps.

13. The non-transitory, computer-readable storage medium of claim 12, wherein:

the data elements comprise columns;

the background is rectangular;

a part of the background above or below the columns forms an identifier marker; and the timestamp further comprises an end marker to right or left of the background, the end marker comprising a fourth color.

14. The non-transitory, computer-readable storage medium of claim 12, wherein detect the timestamps on the captured frames comprises:

scanning lines of a frame;

discovering a timestamp by detecting a first line with a first plurality of consecutive pixels of the third color followed by a second plurality of consecutive pixels of a fourth color, the first plurality of consecutive pixels comprising an identifier marker identifying the timestamp, the second plurality of consecutive pixels comprising an end marker identifying an end of the timestamp; and determining a number represented by the timestamp by detecting a second line with at least a first pixel of the first or the second color, at least a second pixel of the third color that follows the first pixel, at least a third pixel of the first or the third color that follows the second pixel, wherein the first and the third pixels comprise two data elements, the first and the second colors represent first and second values, respectively, and the second pixel comprises an area separating the two data elements.

* * * * *